Patented Aug. 20, 1946

UNITED STATES PATENT OFFICE 2,406,063

DENTAL CEMENT

Walter S. Crowell, Melrose Park, Pa., assignor to The S. S. White Dental Manufacturing Company, a corporation of Pennsylvania No Drawing. Application August 19, 1944, Serial No. 550,322

4 Claims. (Cl. 106—35)

My invention relates particularly to that class of tooth cavity filling materials that is generally termed temporary cement, and is especially directed to a cavity filling cement that will afford convenient insertion into a cavity and its easy removal therefrom with substantially equal facility, and that may be employed as a cavity lining to prevent thermal changes and to guard against chemical agents contained in filling materials from affecting the pulp.

It has been common practice to employ a plastic mass for filling tooth cavities made by mixing together zinc oxide and eugenol or oil of cloves, and it has been found that the simple mixture of zinc oxide with eugenol is very slow in setting, which limits its practical use.

It is well known, as is evidenced by published formulas, that by adding wood rosin or hydrogenated rosin to the zinc oxide a somewhat shorter setting time may be attained, but, however, in order to obtain a desired minimum setting time of eight or ten minutes it has been proposed to add to the powder a metallic acetate such as zinc acetate to obtain the more desirable results.

I have found by timely investigation and experimentation that the thus prepared and compounded ingredients produce more or less satisfactory results when they are freshly prepared, but gradually deteriorate upon standing at room temperature, so that after being subjected to shelf storage for but a few weeks the setting time of the cement is more than doubled and consequently quite unsatisfactory for the purpose intended.

The principal objects of my invention are to provide a temporary cement product in which the ingredients may be stored for reasonably long periods of time without detriment to the setting qualities of the compounded powder and liquid constituents.

Other objects of my invention are to provide a temporary cement product in which the principal accelerating ingredient is contained in the liquid constituent and remains inert until the moment when the powder and liquid constituents are compounded to produce a plastic mass, thus deterioration in storage is prevented.

The form of my invention as hereinafter more definitely described comprises temporary cement constituents which are normally retained in separate containers but which when compounded together produce a plastic cement that will set with reasonable agility, and which include a zinc oxide powder and a liquid containing eugenol and acetic acid.

My invention comprehends a liquid preparation which contains a mixture of eugenol and acetic acid.

My invention also includes all of the various novel features of composition of ingredients and their respective employment as hereinafter more definitely specified.

I have observed that available temporary cement constituents rapidly deteriorate in direct proportion to the time that they are kept after preparation and that the setting time of the cement plastics compounded therefrom varies accordingly.

Consequently, it has been the object of my invention to devise means to so stabilize the constituents, the powder and liquid, that are compounded to produce the plastic cement, that such deterioration may be substantially eliminated and the setting time maintained substantially constant.

I have found that by including in the liquid constituent, eugenol and as a catalyst a relatively small percentage of acetic acid, when it is compounded with the powder constituent, including zinc oxide, a cement may be produced whose setting time is not affected to any appreciable extent by the length of time that the separate constituents have been prepared.

A satisfactory temporary cement has been produced by including in the liquid constituent eugenol 99.5 cc. and acetic acid 0.5 cc. and mixing said liquid constituent with the zinc oxide powder constituent in the proportions of 1.5 gms. powder to 0.1 cc. liquid, which produces a putty-like mix particularly suitable for lining a tooth cavity. This will set in from six to eight minutes, and relatively thinner mixes will set in approximately the same time.

I do not desire to limit my invention to the precise ingredients and proportions herein set forth as it is obvious that various modifications may be made without departing from the spirit and scope of my invention as defined in the appended claims.

Having thus described my invention, I claim:

1. A dental cement liquid adapted to be mixed with a cement powder to produce a cavity filling, comprising a liquid solution which includes eugenol and a relatively low percentage of acetic acid.

2. A dental cement liquid adapted to be mixed with a cement powder to produce a cavity filling, comprising a liquid solution which includes in proportions substantially eugenol 99.5 cc. and acetic acid 0.5 cc.

3. A dental cement liquid adapted to be mixed with a filling cement powder to produce a cavity filling comprising a liquid solution which includes in proportions substantially eugenol 95 cc. to 99.9 cc. and acetic acid in proportions from 5 cc to 1/10 cc.

4. A dental cement liquid adapted to be mixed with a filling cement powder to produce a cavity filling, and comprising eugenol acidified by from .05% to 2% acetic acid.

WALTER S. CROWELL.